US011460310B1

(12) United States Patent
Kelly et al.

(10) Patent No.: US 11,460,310 B1
(45) Date of Patent: *Oct. 4, 2022

(54) AUTONOMOUS VEHICLE TAXI/DELIVERY SERVICE

(71) Applicant: United Services Automobile Association (USAA), San Antonio, TX (US)

(72) Inventors: Patrick Brian Kelly, Boeme, TX (US); Olvin Brett Lewis, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/867,789

(22) Filed: May 6, 2020

Related U.S. Application Data

(63) Continuation of application No. 15/918,850, filed on Mar. 12, 2018, now Pat. No. 10,677,603.

(60) Provisional application No. 62/470,977, filed on Mar. 14, 2017.

(51) Int. Cl.
*G01C 21/34* (2006.01)
*G06Q 10/02* (2012.01)
*G08G 1/127* (2006.01)
*G05D 1/02* (2020.01)
*G06Q 50/30* (2012.01)

(52) U.S. Cl.
CPC ....... *G01C 21/3438* (2013.01); *G05D 1/0291* (2013.01); *G06Q 10/02* (2013.01); *G06Q 50/30* (2013.01); *G08G 1/127* (2013.01); *G05D 2201/0213* (2013.01)

(58) Field of Classification Search
CPC ............ G01C 21/3438; G05D 1/0291; G05D 2201/0213; G06Q 10/02; G06Q 50/30; G08G 1/127
See application file for complete search history.

(56) References Cited

U.S. PATENT DOCUMENTS

| | | | |
|---|---|---|---|
| 9,715,233 B1* | 7/2017 | Mandeville-Clarke | ...................... H04W 4/029 |
| 2015/0338852 A1* | 11/2015 | Ramanujam | ........... G08G 1/202 701/2 |
| 2017/0187707 A1* | 6/2017 | Miu | ......................... G09C 5/00 |
| 2018/0081360 A1* | 3/2018 | Bostick | ................. G06Q 10/04 |
| 2018/0129221 A1 | 5/2018 | Mandeville-Clarke et al. | |

* cited by examiner

*Primary Examiner* — Mary Cheung
(74) *Attorney, Agent, or Firm* — BakerHostetler (57) ABSTRACT

The present invention provides a system, method, and software for operating a taxi and delivery service using a fleet of autonomously driven vehicles amassed from a plurality of unassociated individuals and providing a graphical user interface for interested parties to register their vehicles for use and for customers to schedule services.

20 Claims, 9 Drawing Sheets

SUMMARY OF LEVELS OF DRIVING AUTOMATION FOR ON-ROAD VEHICLES

THIS TABLE SUMMARIZES SAE INTERNATIONAL'S LEVELS OF *DRIVING AUTOMATION* FOR ON-ROAD VEHICLES. INFORMATION REPORT J3016 PROVIDES FULL DEFINITIONS FOR THESE LEVELS AND FOR THE ITALICIZED TERMS USED THEREIN. THE LEVELS ARE DESCRIPTIVE RATHER THAN NORMATIVE AND TECHNICAL RATHER THAN LEGAL. ELEMENTS INDICATE MINIMUM RATHER THAN MAXIMUM CAPABILITIES FOR EACH LEVEL. "SYSTEM" REFERS TO THE DRIVER ASSISTANCE SYSTEM, COMBINATION OF DRIVER ASSISTANCE SYSTEMS, OR *AUTOMATED DRIVING SYSTEM*, AS APPROPRIATE.

THE TABLE ALSO SHOWS HOW SAE'S LEVELS DEFINITIVELY CORRESPOND TO THOSE DEVELOPED BY THE GERMAN FEDERAL HIGHWAY RESEARCH INSTITUTE (BASt) AND APPROXIMATELY CORRESPOND TO THOSE DESCRIBED BY THE US NATIONAL HIGHWAY TRAFFIC SAFETY ADMINISTRATION (NHTSA) IN ITS "PRELIMINARY STATEMENT OF POLICY CONCERNING AUTOMATED VEHICLES" OF MAY 30, 2013.

| LEVEL | NAME | NARRATIVE DEFINITION | EXECUTION OF STEERING AND ACCELERATION/ DECELERATION | MONITORING OF DRIVING ENVIRONMENT | FALLBACK PERFORMANCE OF *DYNAMIC DRIVING TASK* | SYSTEM CAPABILITY (*DRIVING MODES*) | BASt LEVEL | NHTSA LEVEL |
|---|---|---|---|---|---|---|---|---|
| | *HUMAN DRIVER* MONITORS DRIVING ENVIRONMENT | | | | | | | |
| 0 | NO AUTOMATION | THE FULL-TIME PERFORMANCE BY THE *HUMAN DRIVER* OF ALL ASPECTS OF THE *DYNAMIC DRIVING TASK*, EVEN WHEN ENHANCED BY WARNING OR INTERVENTION SYSTEMS | HUMAN DRIVER | HUMAN DRIVER | HUMAN DRIVER | N/A | DRIVER ONLY | 0 |
| 1 | DRIVER ASSISTANCE | THE *DRIVING MODE-SPECIFIC* EXECUTION BY A DRIVER ASSISTANCE SYSTEM OF EITHER STEERING OR ACCELERATION/DECELERATION USING INFORMATION ABOUT THE DRIVING ENVIRONMENT AND WITH THE EXPECTATION THAT THE *HUMAN DRIVER* PERFORM ALL REMAINING ASPECTS OF THE *DYNAMIC DRIVING TASK* | HUMAN DRIVER AND SYSTEM | HUMAN DRIVER | HUMAN DRIVER | SOME DRIVING MODES | ASSISTED | 1 |

FIG. 6B

| | | | | | |
|---|---|---|---|---|---|
| 2 | PARTIAL AUTOMATION | THE *DRIVING MODE*-SPECIFIC EXECUTION BY ONE OR MORE DRIVER ASSISTANCE SYSTEMS OF BOTH STEERING AND ACCELERATION/DECELERATION USING INFORMATION ABOUT THE DRIVING ENVIRONMENT AND WITH THE EXPECTATION THAT THE *HUMAN DRIVER* PERFORM ALL REMAINING ASPECTS OF THE *DYNAMIC DRIVING TASK* | SYSTEM | HUMAN DRIVER | HUMAN DRIVER | SOME DRIVING MODES | PARTIALLY AUTOMATED | 2 |
| *AUTOMATED DRIVING SYSTEM ("SYSTEM") MONITORS THE DRIVING ENVIRONMENT* | | | | | | | | |
| 3 | CONDITIONAL AUTOMATION | THE *DRIVING MODE*-SPECIFIC PERFORMANCE BY AN *AUTOMATED DRIVING SYSTEM* OF ALL ASPECTS OF THE *DYNAMIC DRIVING TASK* WITH THE EXPECTATION THAT THE *HUMAN DRIVER* WILL RESPOND APPROPRIATELY TO A *REQUEST TO INTERVENE* | SYSTEM | SYSTEM | HUMAN DRIVER | SOME DRIVING MODES | HIGHLY AUTOMATED | 3 |

FIG. 6C

| | | | | | 3/4 |
|---|---|---|---|---|---|
| | | | | | FULLY AUTOMATED |
| | | | | SOME DRIVING MODES | |
| 4 | HIGH AUTOMATION | THE *DRIVING MODE-SPECIFIC* PERFORMANCE BY AN *AUTOMATED DRIVING SYSTEM* OF ALL ASPECTS OF THE *DYNAMIC DRIVING TASK*, EVEN IF A *HUMAN DRIVER* DOES NOT RESPOND APPROPRIATELY TO A *REQUEST TO INTERVENE* | SYSTEM | SYSTEM | SYSTEM | |
| 5 | FULL AUTOMATION | THE FULL TIME PERFORMANCE BY AN *AUTOMATED DRIVING SYSTEM* OF ALL ASPECTS OF THE *DYNAMIC DRIVING TASK* UNDER ALL ROADWAY AND ENVIRONMENTAL CONDITIONS THAT CAN BE MANAGED BY A *HUMAN DRIVER* | SYSTEM | SYSTEM | SYSTEM | ALL DRIVING MODES |

FIG. 11

AUTONOMOUS VEHICLE TAXI/DELIVERY SERVICE

CROSS-REFERENCE TO RELATED APPLICATIONS

The present application is a continuation of U.S. patent application Ser. No. 15/918,850 filed Mar. 12, 2018, which claims priority to and the benefit of U.S. Provisional Patent Application No. 62/470,977 filed Mar. 14, 2017, the contents of which are incorporated herein by reference and made a part hereof.

FEDERALLY SPONSORED RESEARCH OR DEVELOPMENT

N/A

FIELD OF THE INVENTION

The present invention provides an autonomous vehicle taxi service using a fleet of vehicles owned by a plurality of unassociated people, and more particularly to a control system for registering vehicles for use in the fleet, taking and scheduling route orders, selecting a vehicle from the fleet to service the request, tracking the vehicles, and billing clients and paying vehicle owners a rental fee for temporary use of their vehicle(s).

DESCRIPTION OF THE PRIOR ART

Figure 6B:
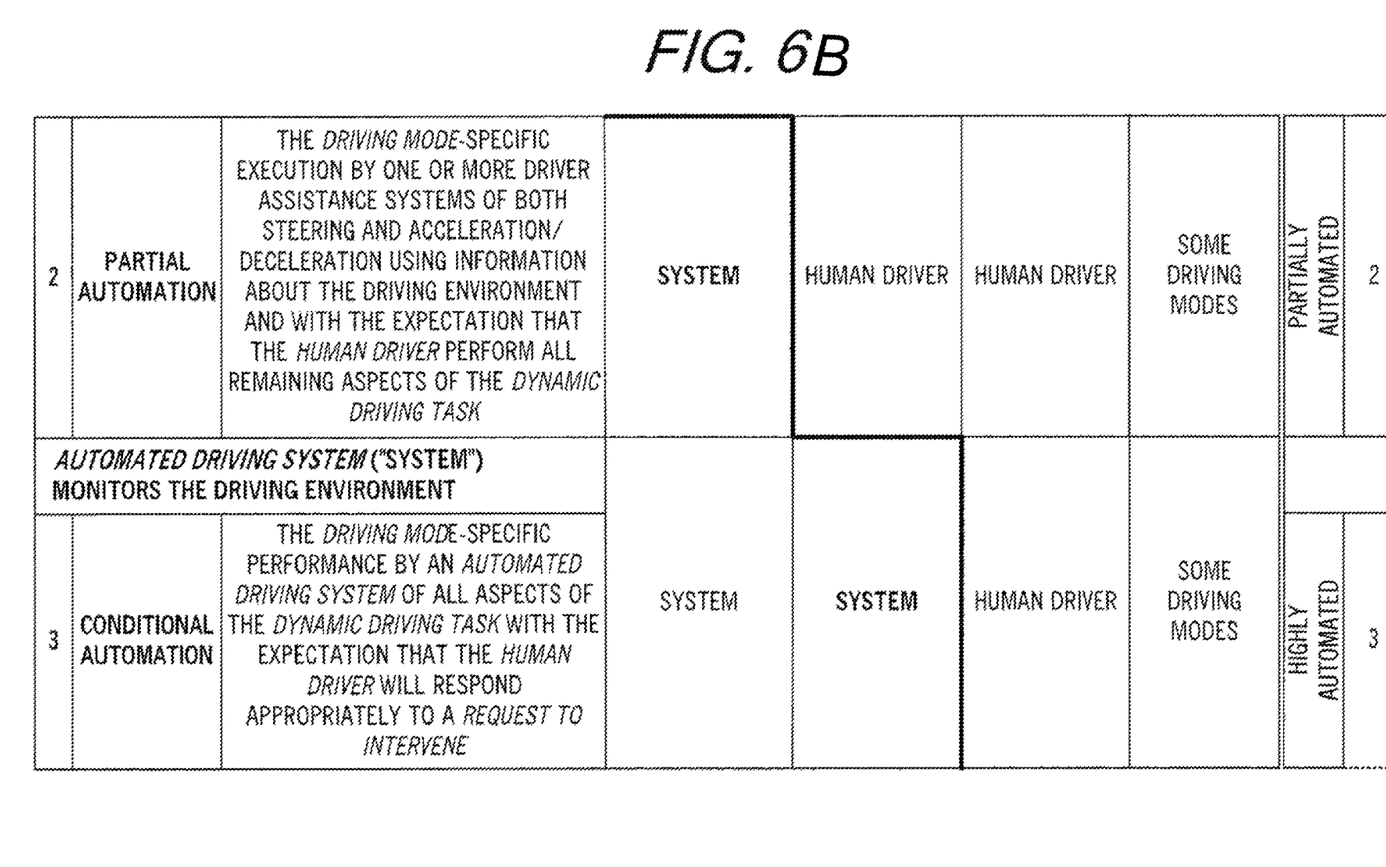
FIG. 6 is a Summary of Levels of Driving Automation for On-Road Vehicles.
Figure 6C:
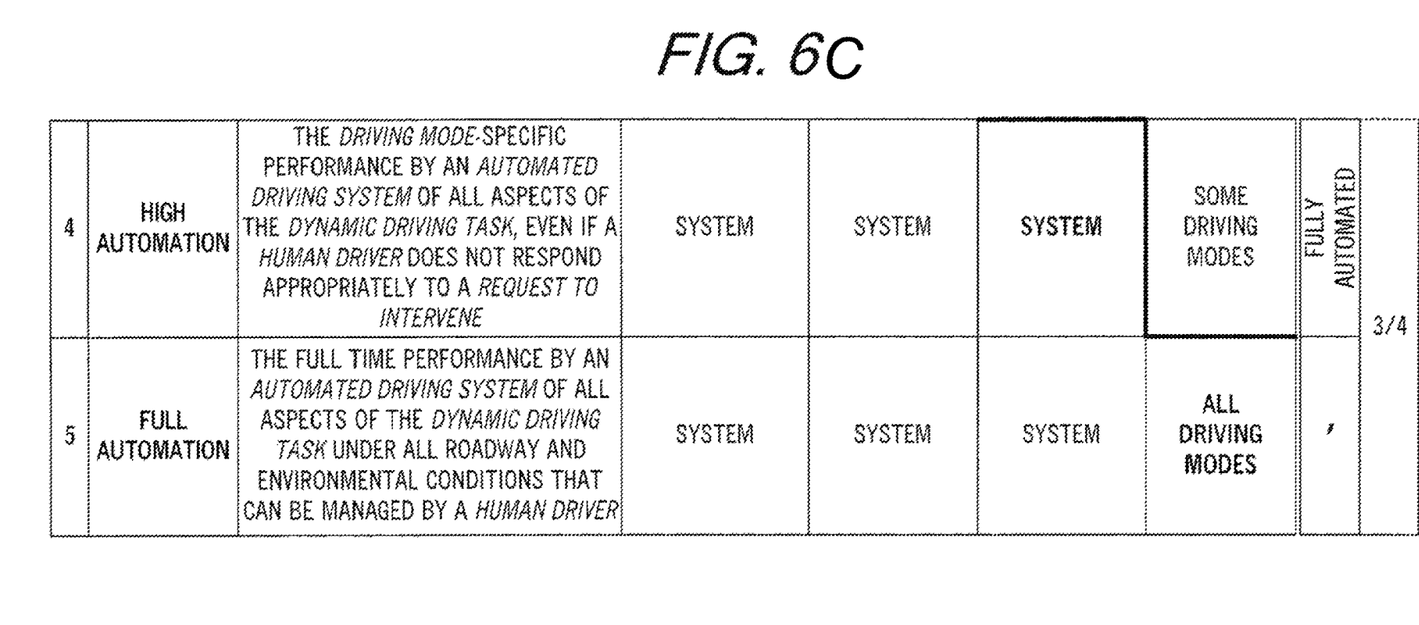

Autonomous driving vehicles are under development by car manufacturers as well as the infrastructure to accommodate them on today's roads. SAE International has developed definitions for six levels of driving automation Levels 0-5 (FIG. 6). Levels 0-2 require a human driver to monitor the driving environment and levels 3-5 require an automated driving system to monitor the driving environment. Vehicles of levels 0-2 are on the road today and have an onboard control system for assisting a driver of a host vehicle in tracking adjacent vehicles. Existing driver assist systems include adaptive cruise control, forward collision warning, lane keeping and lane departure systems, and the like. These systems utilize input from sensors such as RADAR, LIDAR, LASER and optical cameras to track vehicles surrounding the host vehicle. The onboard systems can take measures such as flashing a warning light on the dashboard, side-view or rear-view mirrors, or other display and by applying brakes to slow or stop the host vehicle.

Vehicles of levels 3-5 are being tested on today's roads but are not available for purchase by the general public on a large scale in the United States. In order to ascend to SAE Level 4 and above, a key element must be created to allow for automobiles of all shapes and sizes to freely navigate our highway and road infrastructure. We will experience a gradual blend of varying levels of Autonomous and Non-Autonomous vehicles.

Fully autonomous vehicles of level 5 offer opportunities that other autonomous vehicles of lower levels cannot provide. That is, the autonomous driving vehicles having a full level 5 automation can be used for money-making endeavors when not in use by the owner. The present invention provides such an opportunity for such vehicles to be used in a taxi/delivery service. For example, if an owner of such a fully-automated vehicle uses the vehicle to commute to and from work, for example, the vehicle will be idle while at work and while at home. This presents time periods in which the vehicle can be used to deliver passengers or inanimate objects from one location to another. The vehicles can also be made available for rental over a period of time where a customer can use the vehicle as he or she sees fit.

The present invention provides a system and method for owners of autonomous vehicles to register their vehicles with a taxi/delivery service that can schedule such vehicles for use for a rental fee. Such system can create a fleet of autonomously driven vehicles of level 5 automation owned by unassociated owners in diverse geographical locations to render a taxi/delivery service without the need of the provider of such services to purchase a fleet of vehicles.

SUMMARY OF THE INVENTION

The present invention provides a system, method, and software for operating a taxi and delivery service using a fleet of taxis amassed from a plurality of unassociated individuals. The taxi/delivery service provides a web-enabled registration GUI for owners of autonomously driven vehicles to register their vehicles for use in the taxi and delivery service. The service provider will register a plurality of autonomously driven vehicles to define a fleet of vehicles. The service will also provide a customer GUI for a customer to request the use of an autonomously driven vehicle from a pick-up location to a destination location or for a period of time, each with an associated fee. The service provider will select a suitable vehicle from the fleet of vehicles based on the customer's request, and the proximity of the vehicle to the pick-up location, among other possible considerations. The service provider will deploy the selected autonomously driven vehicle from its current location to the pick-up location and enter either the destination location into a navigation system or a time period during which the customers can use the selected autonomously driven vehicle as a rental car. The service provider will be equipped to receive payment from the customer for the taxi and delivery service. The service provider will also be equipped to remit payments to the owners of fleet vehicles. The taxi/delivery service also provides for the delivery from a pick-up location to a destination location of inanimate objects and non-human living entities.

BRIEF DESCRIPTION OF THE DRAWINGS

To understand the present invention, it will now be described by way of example, with reference to the accompanying drawings and attachments in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
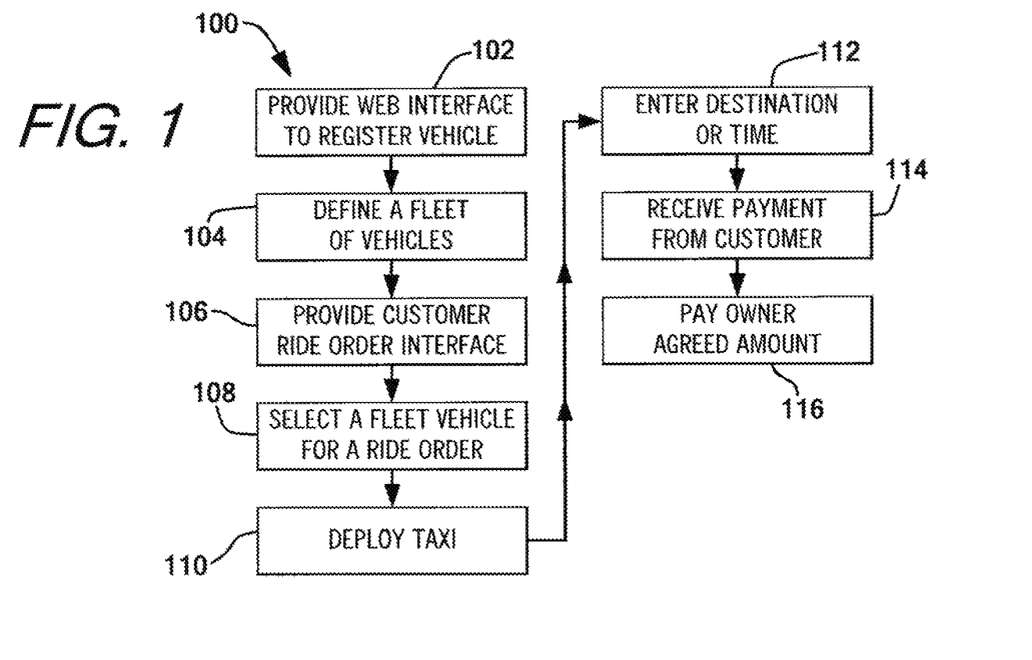
FIG. 1 is a flowchart of a method of the present invention.

The present invention provides a method, a non-transitory computer readable media for carrying out the method when run by a computer processor, and a system of electronically connected servers having processors running the software to carry out the method. FIG. 1 shows a flowchart of a method 100 for operating a taxi and delivery service using a fleet of vehicles owned by a plurality of owners unassociated with one another. At step 102, a provider of the taxi services provides a first web-based user-interface for owners of autonomously driven vehicles to register their vehicles for use in the taxi and delivery service. At step 104, a provider of the taxi/delivery service will provide a webpage or web-based interface for registering a plurality of autonomously driven vehicles to define a fleet of vehicles. At step 106, a provider of the taxi/delivery service provides a first web-based interface for a customer to request the use of an autonomously driven vehicle from a pick-up location to a destination location, or for use by the customer of the vehicle for a period of time, for a fee.

At step 108, the provider of the taxi/delivery service will implement a software system for selecting an autonomously driven vehicle from the fleet of vehicles based on the availability of the vehicle, and the proximity of the vehicle to the pick-up location. Other parameters can be taken into account when selecting a fleet vehicle. At step 110, after selecting a suitable fleet vehicle, the vehicle is deployed from its current location to the pick-up location. At step 112, the destination location is entered into a navigation system, or a time period where the customers can use the selected autonomously driven vehicle. At step 114, the provider of the service receives payment from the customer for the taxi and delivery service. At step 116 the provider of the service pays the owner of the vehicle an agreed amount for use of the vehicle.

Figure 2:
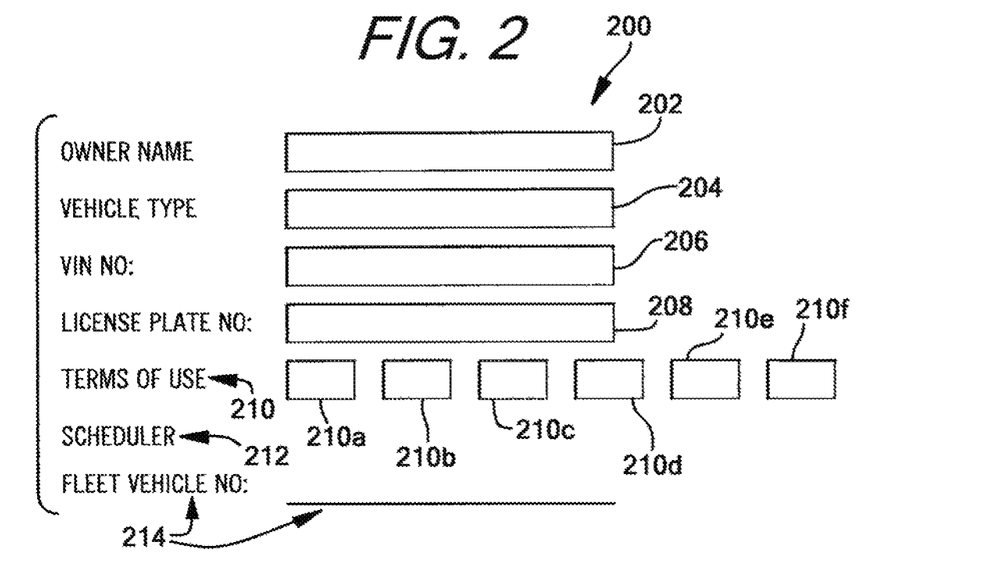
FIG. 2 is a graphical user interface for owners of an autonomously driven vehicle to register their vehicle for use in a taxi/delivery service.

FIG. 2 shows a web-based user interface 200 for an owner of an autonomous driving vehicle to register a vehicle for use by a taxi service. The user interface 200 will include data fields such as the owner's name 202, a vehicle type 204 (make, model, etc.), a VIN number 206 of the vehicle, a license plate number 208, a terms of use data fields 210 and a scheduler 212 to specify the dates and time periods when the vehicle is available for use by the taxi service.

The terms-of-use fields 210 can specify conditions such as maximum distance of a ride request 210a, no smoking in the vehicle 210b, acceptable geographical areas 210c, no food or drink 210d, maximum number of passengers 210e, location for refuel, repair or service 210f, among many other possible terms. In one form of the invention, the terms of service, which could include physical access to the vehicle can be expressed as key types. For example, a personal key, a valet key, a master key, an OEM key, and a timed key. The permission keys can be implemented in software or by physical items that are brought into the sensors of the vehicle for reading the permission level from the physical key. A personal key permission level would allow for use of the vehicle without limitation to speed and direction. A valet key permission level would only allow the vehicle to be driven at low speeds and for short distances. A master-key permission allows a person to register the vehicle and to select the terms of use. An OEM key is issued by the manufacturer of the vehicle and allows for servicing or recall of the vehicle to specified dealer locations for scheduled periods of time. The timed key is one that works for a specified period of time or for a single trip.

The scheduler 212 will provide a calendar for specifying the date and time periods where the vehicle will be available. The interface will allow for selecting dates and times using features typically available with calendaring software such as in Microsoft Outlook for example. Upon successful registration of the vehicle with the service provider, a fleet vehicle identification number is issued 214 and displayed to the owner.

Figure 3:
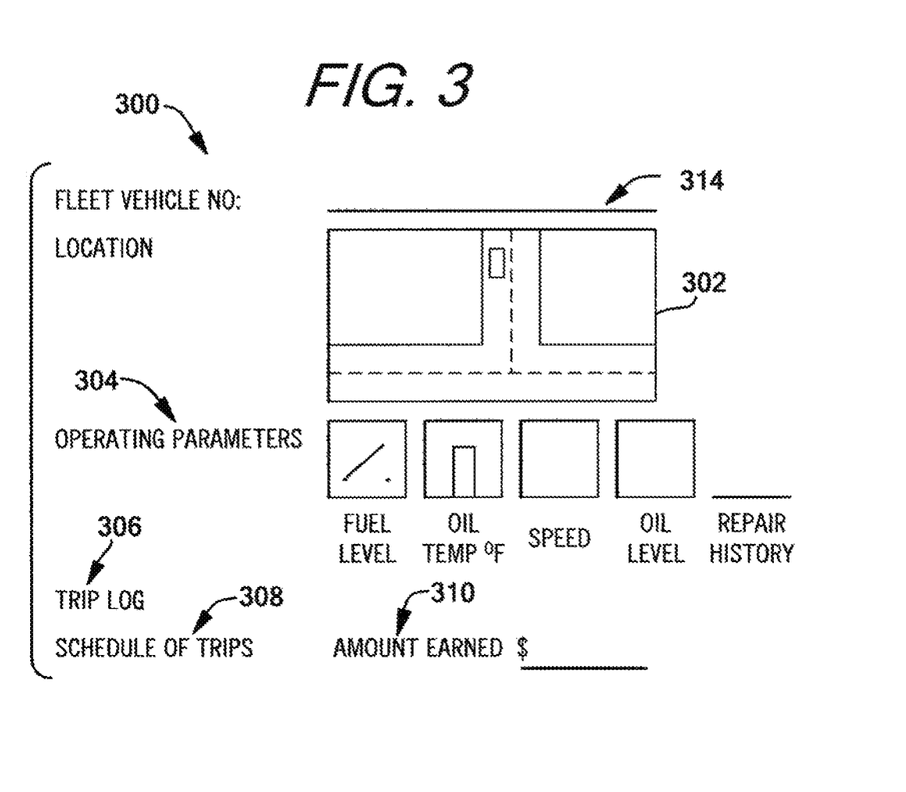
FIG. 3 is a graphical user interface for registered owners of a fleet vehicle to monitor their vehicle.

FIG. 3 shows an example of an owner's web-based interface 300 for monitoring the location of a registered vehicle by fleet vehicle number 314 which can be entered into a data field or selected from a drop down list. The interface 300 also has a field or area on the screen 302 for displaying a map showing the location of the owner's vehicle. Preferably the display will include a map showing the location of the vehicle, the speed of the vehicle, the heading of the vehicle, the operating parameters 304 of the vehicle. The operating parameters can include the present speed of the vehicle, odometer reading, oil pressure, oil temperature, fuel level, tire pressure, battery life, repair history among many other parameters that can be measured to describe the vehicle's functioning. The interface 300 provides a log 306 of trips that have been taken and a schedule 308 of future trips. The interface 300 can also provide a field 310 showing the amount of money earned by the vehicle for any selected period of time.

Figure 4:
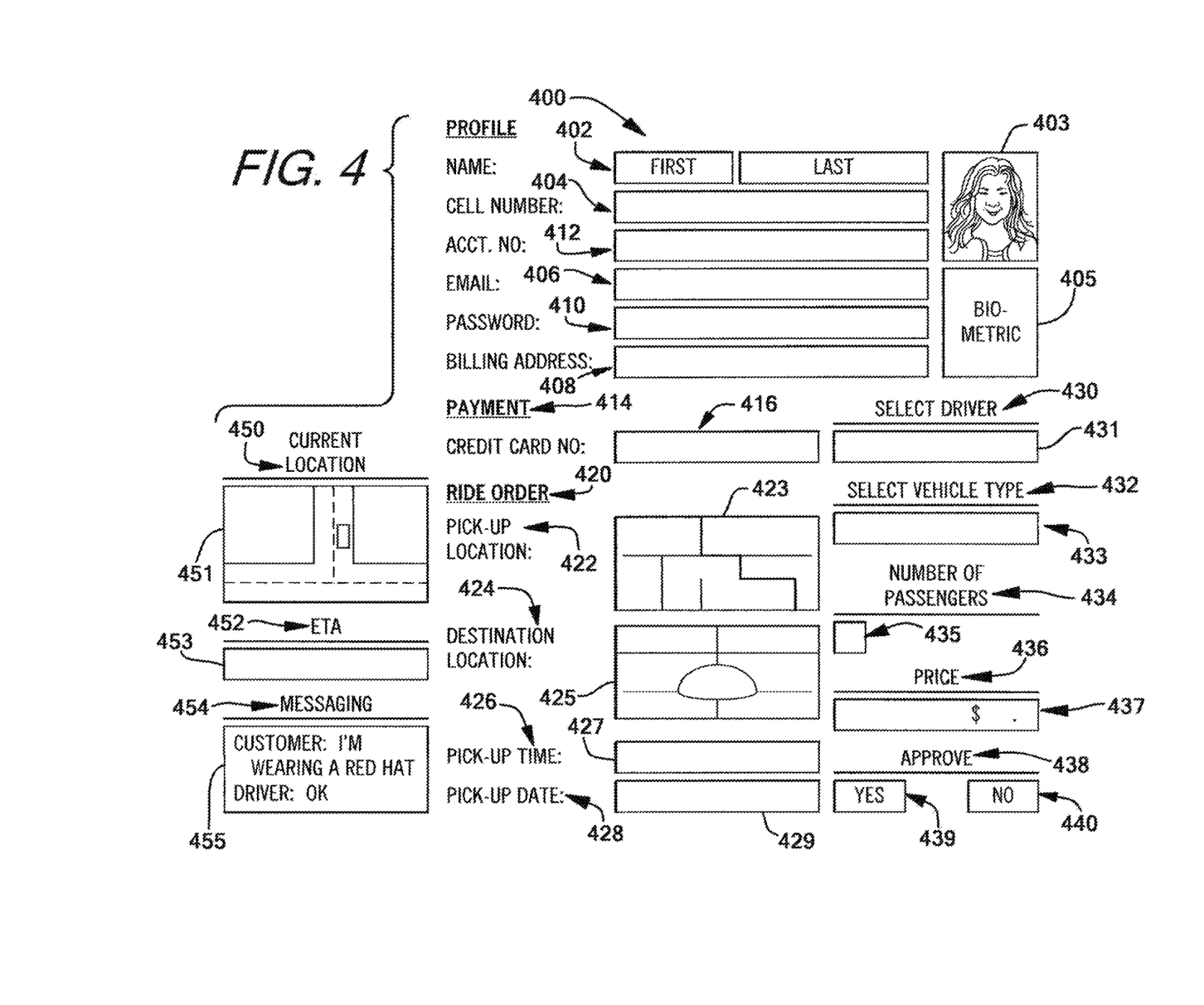
FIG. 4 is a graphical user interface for a customer to register for a taxi/delivery service and a ride order placement.

FIG. 4 shows a customer graphical user interface (GUI) 400 for a customer to place ride orders. In one preferred form, the customer GUI will be employed by an app on a cellular telephone so a customer can place ride orders using a cellular telephone, among other electronic devices. Initially, customers will first download the app and go through a registration process where they will enter their names 402, a personal image (selfie) 403 (which can be used by facial recognition software with input from onboard camera(s) described below), cell phone number 404, biometric information 405 (e.g., a finger print or iris scan), email address 406, billing address 408, and a password 410, for example. Upon successful registration, the customer will be issued an account number 412.

The customer GUI 400 will have a portion for the customer to specify a payment method 414 and will include fields, for example, to enter credit card information such as an account number 416, expiration date, and a security number such as a CSC or CVV.

The customer GUI 400 will also have a Ride Order section 420 where the customer can specify a pick-up location, preferably by indicating on a map 423 or entering the location with a data entry device like a keyboard, keypad, or microphone. The customer can also specify a destination location 424 using a map 425 or other data entry device. A data field 427 is provided to enter a pick-up time 426 and a pick-up date 428,429. The customer GUI 400 has a section 430 for selecting a driver. A driver is optional but one may be necessary if, for example, the vehicle is being used to transport inanimate objects and a "driver" is necessary to assist in loading the vehicle or to take over control of the vehicle in the event it becomes necessary for whatever reason. A data field 431 allows for a customer to enter a name of a driver or to pick the driver from a list of names. The customer interface can provide rating information for each driver to assist in the selection of a driver. The customer interface also provides a section 432 for the customer to select a vehicle type 433 such as automobile, truck, motorcycle, bus, limousine, drone, etc. The customer interface 400 also has a section 434 for the customer to specify the number of passengers 435.

The customer can enter this information and will be provided, in a price section 436, and amount of the fee 437 for the taxi/delivery service. The customer interface has a section 438 where radio buttons 439,440 are provided to approve or not approve the price. If the customer approves the price then the customer's credit card can be charged and a suitable vehicle can be deployed by the provider of the service to the pick-up location.

The customer GUI 400 will also have a messaging system portion 454 having a data entry and display area 455 for a customer or passenger to communicate with the provider of the taxi/delivery service, the driver, and/or the vehicle.

Figure 5:
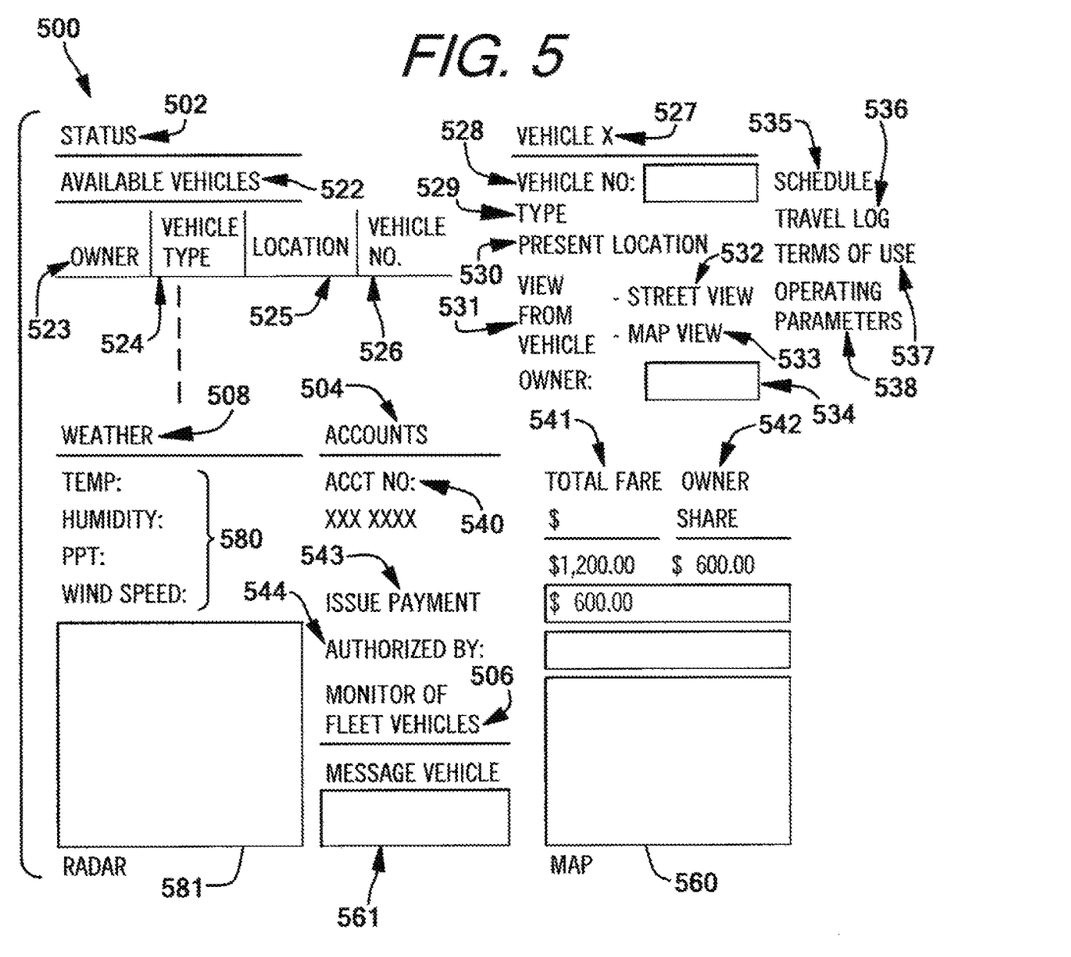
FIG. 5 is a graphical user interface for a taxi/delivery service provider to manage and monitor fleet vehicles, accounts, and weather conditions, for example.

FIG. 5 shows an exemplary service-provider or manager GUI 500 to allow a human to manage the fleet of vehicles. The manager GUI 500 will have a status section 502, an accounts section 504, a monitor of fleet of vehicles section 506, and a weather section 508. The status section 502 provides detailed information about every vehicle in the fleet and preferably displayable in sortable tables, such as the Available Vehicles table 522 having columns such as owner name 523, vehicle type 524, current location 525, vehicle number 526, etc. Additional columns can be added to include any of the information gathered from the owner, the registered vehicle, and from other sources necessary for the purpose of providing taxi/delivery services using a fleet of vehicles constituted by disparately owned autonomously driven vehicles.

Under the heading Vehicle X 527, is a detailed listing of all information known about vehicle X. A user can select a vehicle from the table 522 using a mouse click or other selection method and the detailed information is provided. The detailed information can include information such as a vehicle number 528 such as a VIN number, license plate number or other identifier. The present location 530 of the vehicle X can be displayed based on information sent from the vehicle, or other source such as a global positioning satellite network (GPS), GOOGLE MAPS, and others (map view 533). The present location can also be displayed based on data collected from an onboard camera to show the location from the perspective of the vehicle or street view 533.

The detailed listing of information for vehicle X can also provide the owner's name 534, a schedule for the vehicle 535, a travel log 536 showing all trips made for a specified period of time, terms of use 537, and operating parameters 538 as defined herein. The detailed listing can also include account information 504 where any of the accounts can be displayed alone or in a sorted list under columns such as account number 540, total fares earned 541 for a given time period, and the owner's share 542. The issue payment field 543 can facilitate payments by the provider of the taxi/delivery service and include a field for identifying the person who authorized the payment 544.

The manager GUI 500 also includes a display area to monitor the fleet of vehicles 506 using a map 560 showing the location of every fleet vehicle, or a selected vehicle(s) in a particular geographical area. Indicia representing the location of each vehicle in the fleet of vehicles can be shown on a map, and a manager of the taxi/delivery service can select a vehicle using a mouse click or other data entry device and obtain the detailed listing for that selected vehicle. The indicia can be color coded to represent the type of vehicle, its status (not available, available, or in use, for example) or other parameter as desired. Also, a message vehicle data field 561 is provided for the manager to communicate with the vehicle or the passengers of the vehicle using a data entry device such as a keyboard, keypad, either virtual or real, and a microphone for oral dictation of a message.

The manager GUI 500 can also include a weather monitoring area 508 showing a panel of weather conditions 580 and a Doppler radar display 581 for example.

Suitable autonomous driving vehicles referred to are those that are fully automated and capable of safely traversing roadways, airways, planetary orbits, railways and waterways without human input from an onboard driver/pilot/captain/astronaut ("driver" for short). The vehicles can be ground engaging vehicles such as wheeled vehicles, tracked vehicles, sleds; flying vehicles such as drone helicopters, and drone fixed-wing aircraft; rail engaging vehicles such as trains and monorails; space flying vehicles such as rocket drones; and water engaging vehicles such as drone ships, boats and submarines.

Figure 7:
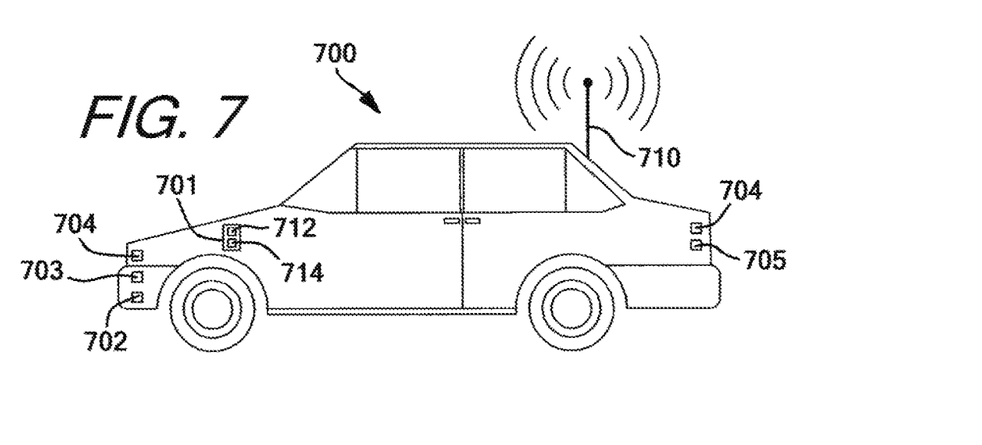
FIG. 7 is a schematic representation of an autonomously driven vehicle.

Suitable autonomously driven wheeled vehicles include those having from one wheel to 18 wheels and more. While the autonomously driven vehicle can operate without driver input, such vehicles can allow for drivers, onboard or remotely located, to override the autonomous control system and take control of piloting the vehicle, without departing from the scope of the present invention. In one exemplary autonomously driven vehicle 700 shown in FIG. 7, the vehicle has a telematics system 701 with input from sensors such as RADAR 702, LIDAR 703, LASER 705, and an optical camera(s) 704. The vehicle will also have an antenna 710 for receiving and transmitting signals to control and monitor the vehicle and for other purposes. The telematics system will have a navigation system 712 and a control system 714 implemented by software to control the speed and direction of the vehicle safely on roadways and without human intervention. The optical camera(s) when used in conjunction with face-recognition software, and the customer image 403, can recognize the customer to assist in locating a pick-up location. The optical cameras can also work in conjunction with other software for recognizing landmarks, reading addresses, for use by a provider of the taxi/delivery service to help navigate the vehicle, or to record the successful delivery of a fare or package, among numerous other possibilities that are only limited by the imagination of a person skilled in the art.

Figure 8:
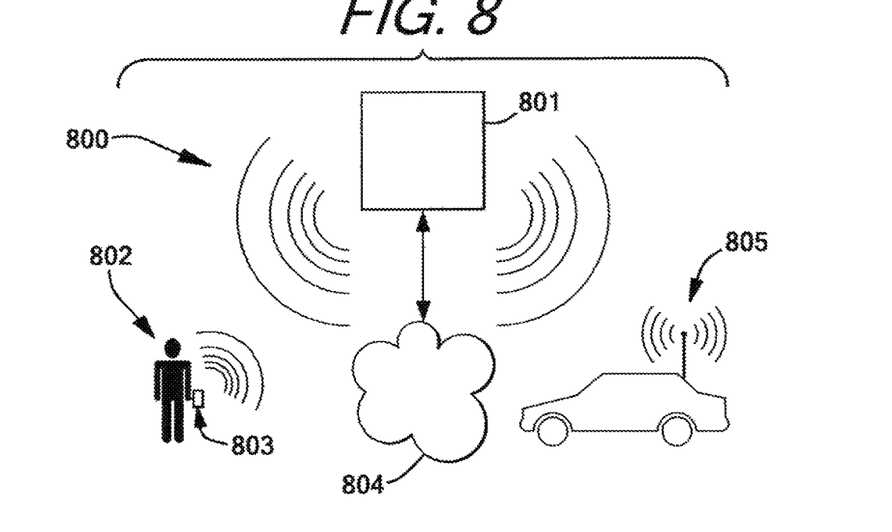
FIG. 8 is a schematic representation of a system for providing taxi/delivery services.

FIG. 8 shows a simple schematic representation 800 of an interaction between a provider of the taxi/delivery service 801, a customer 802 with a cellular telephone 803 communicating through an electronic network 804 to place a ride order and the provider 801 communicates through the network 804 or directly to an autonomously driven vehicle 805.

Figure 9:
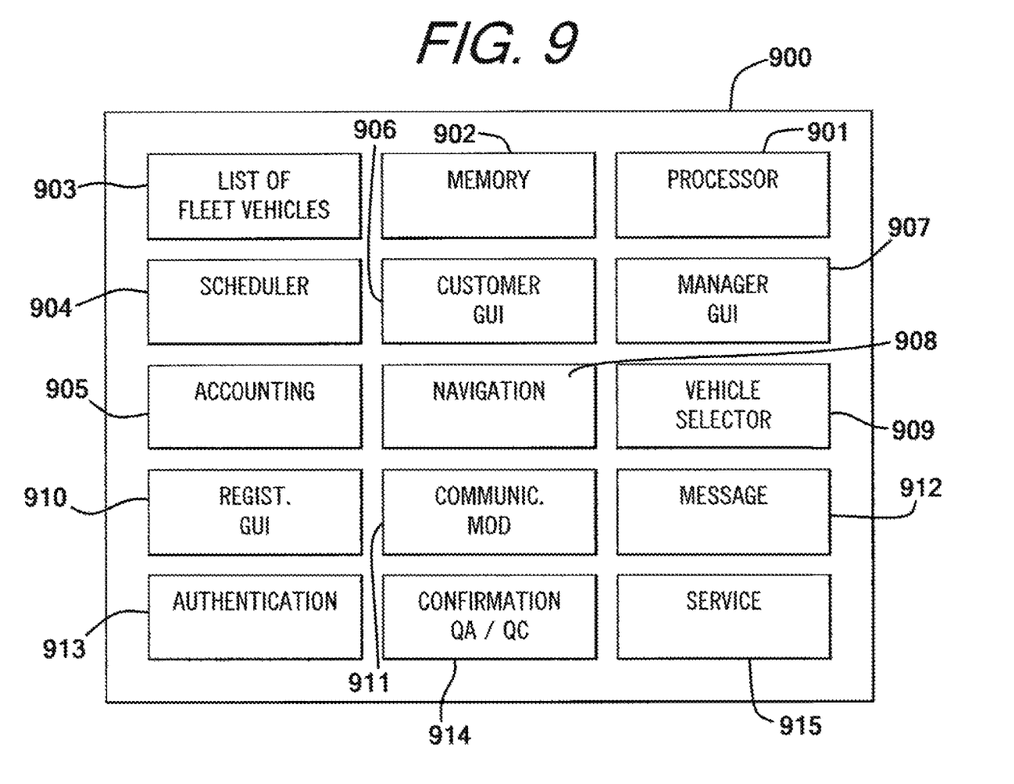
FIG. 9 is a schematic representation of a server for providing the functions and communications to provide taxi/delivery services using a fleet of autonomously driven vehicles owned by a plurality of individuals or entities unassociated with one another.

FIG. 9 is a schematic representation of a server 900 for providing a taxi/delivery service using a fleet of autonomously driven vehicles owned by an unassociated group of individuals or entities. The server 900 can have a processor 901 and a memory 902. The memory can store software for carrying out the methods disclosed. The server will also have a database of a list of fleet vehicles 903 with the detailed information set forth above for each vehicle. The server will also have a scheduler 904, an accounting module 905, a module for providing a customer GUI 906 and a manager GUI 907. The server will also have a navigation module 908 capable of communicating with GPS systems and other road sensors and with fleet vehicles to guide fleet vehicles to pick-up and destination locations. The server will also have a selection module 909 for selecting the most appropriate fleet vehicle for the ride order. The server will also have a registration module to provide the registration GUI 910 for registering fleet vehicles, a communication module 911 for sending and receiving electronic communications, a message module 912 for text communications among fleet vehicles and the server 900, an authentication and security module 913, and a confirmation/QC/QA module 914. The server will also have a service/repair module 915 for tracking the operating parameters of a fleet vehicle and determining whether the vehicle needs servicing of any time such as refueling, fluids check, tire pressure check, engine tune up, etc.

The authentication/security module 913 is employed through software and hardware and is responsible for verifying the identity of the customer and maintaining the security of communications necessary for the implementation of the taxi/delivery service. The confirmation/QC/QA confirms a ride order has been successfully completed to the satisfaction of the customer and the service can be analyzed using quality control (QC) and quality assurance (QA) methodologies. Should an issue arise that needs human intervention, a message will be sent to the provider of the service for resolution.

Figure 10:
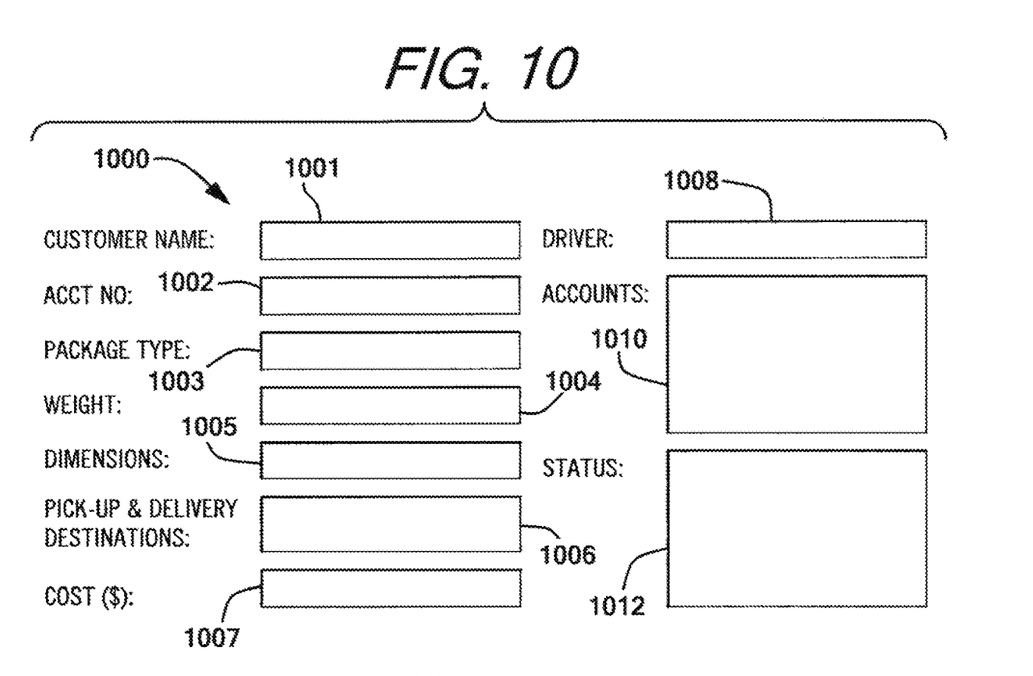
FIG. 10 is an exemplary courier GUI.

FIG. 10 shows a courier GUI 1000 for a customer to use for pick-up and delivery of inanimate objects such as packages or non-human living animals such as pets. A courier customer will go through a registration process much the same as a taxi customer, although there may be some differences to account for the delivery of inanimate objects rather than humans, and other commercial terms may be used for transferring ownership of and responsibility for the items being sent. The courier GUI will provide data fields to display or enter a customer name 1001, an account number 1002, a package type 1003, a weight of the package 1004, the dimensions of the package 1005, a pick-up location and a delivery destination 1006, and a cost of delivery 1007. A data field 1008 is provided to specify the need for a driver and/or to select a driver to assist in delivery of the package. The courier GUI will also have an accounts section 1010 to track payments for deliveries. The courier GUI will also have a status section 1012 for the customer to track the status of shipments including the present location and an estimated time for delivery.

Figure 11:
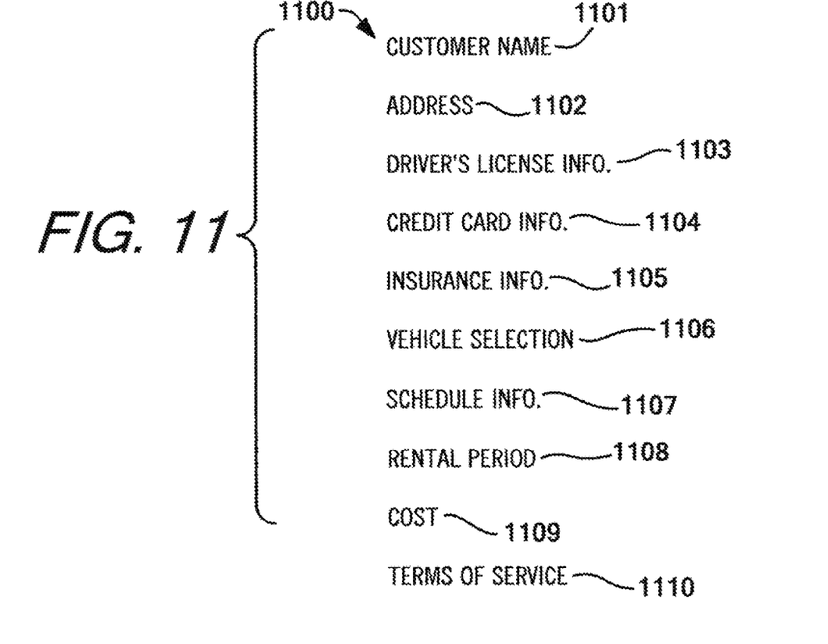
FIG. 11 is an exemplary car-rental GUI.

FIG. 11 shows a car-rental GUI 1100 for customers to use like a rental car. The car-rental GUI 1100 will have data fields for a customer name 1101, address 1102, driver's license information 1103, credit card information 1104, insurance information 1105, a vehicle selection section 1106, scheduling information 1107, rental period 1108, cost 1109 and terms of service 1110. A person may choose to rent a car over relying on multiple taxi trips to run errands where there are multiple starts and stops over short periods of time that makes placing a ride order for each trip less convenient than renting for a specified time period.

Many modifications and variations of the present invention are possible in light of the above teachings. It is, therefore, to be understood within the scope of the appended claims the invention may be protected otherwise than as specifically described.

We claim:

1. A non-transitory computer readable medium when run by a computer processor carry out a method for operating a taxi and delivery service of autonomously driven vehicles comprising:
   providing a registration graphical user interface (GUI) for owners of autonomously driven vehicles to register for use in the taxi and delivery service;
   registering a plurality of autonomously driven vehicles to define a fleet of vehicles;
   providing a customer GUI for a customer to request the use of an autonomously driven vehicle from a pick-up location to a destination location or for a period of time, each for an associated fee;
   selecting an autonomously driven vehicle from the fleet of vehicles based on the availability of the vehicle, and the proximity of the vehicle to the pick-up location;
   deploying the selected autonomously driven vehicle from its current location to the pick-up location;
   entering either the destination location into a navigation system or a time period where the customers can use the selected autonomously driven vehicle;
   accepting a payment from the customer for the taxi and delivery service; and,
   remitting a payment to the owner of the selected autonomously driven vehicle for use of the vehicle.

2. The medium of claim 1 further comprising the step of obtaining approval of the fee amount from the customer before an autonomously driven vehicle is deployed to the pick-up location.

3. The medium of claim 1 further comprising the step of providing a second web-based interface for the owners to specify when their vehicles will be available for use.

4. The medium of claim 3 wherein the second web-based interface provides data fields for the owners to specify conditions of use of their autonomously driven vehicle.

5. The medium of claim 4 wherein the second web-based interface displays to the owners the locations of their autonomously driven vehicles.

6. The medium of claim 1 further comprising the step of tracking operating parameters of the autonomously driven vehicles in the fleet of vehicles.

7. The medium of claim 6 wherein the operating parameters of the vehicle include its speed, its direction of travel, an oil temperature, a battery charge, a fuel level of the vehicle, a road condition, an oil level, a fluids levels, and a tire pressure.

8. The medium of claim 7 further comprising the step of ordering a fleet vehicle to report to a specific location to refuel.

9. The medium of claim 7 further comprising the step of ordering a fleet vehicle to report to a specific location for service or repair.

10. The medium of claim 1 further comprising a third web-based interface for a customer to place a ride order.

11. The medium of claim 10 further comprising the step of transmitting messages in response to receiving ride orders including an estimated time of arrival of the selected autonomously driven vehicle and the amount of the fee.

12. The medium of claim 11 further comprising the step of transmitting a signal to the customer of the location of the autonomously driven vehicle in route to the pick-up location.

13. A system for providing a taxi/delivery service using a fleet of autonomously driven vehicles owned by an unassociated group of individuals or entities comprising:
- a registration graphical user interface (GUI) for owners of autonomously driven vehicles to register an autonomously driven vehicle for use in the taxi and delivery service;
- a customer GUI for a customer to request the use of an autonomously driven vehicle from a pick-up location to a destination location for an associated fee;
- a server of the taxi/delivery service having a processor and a memory storing computer executable instructions for selecting an autonomously driven vehicle from the fleet of vehicles based on an availability of the autonomously driven vehicle, and a proximity of the autonomously driven vehicle to the pick-up location;
- deploying with the server the selected autonomously driven vehicle from its current location to the pick-up location;
- entering with the server the destination location into a navigation system of the selected autonomously driven vehicle;
- receiving with the server payment from the customer; and,
- remitting with the server a payment to the owner for the use by the customer of the selected autonomously driven vehicle.

14. The system of claim 13 wherein approval by the customer is received by the server of the associated fee amount before the selected autonomously driven vehicle is deployed to the pick-up location.

15. The system claim 13 further comprising a second web-based interface for the owners to specify when their vehicles will be available for use.

16. The system of claim 15 wherein the second web-based interface provides data fields for the owners to specify conditions of use of their autonomously driven vehicle.

17. The system of claim 16 wherein the second web-based interface displays to the owners the locations of their autonomously driven vehicles.

18. The system of claim 13 further comprising tracking with the server operating parameters of the autonomously driven vehicles in the fleet of vehicles.

19. The system of claim 18 wherein the operating parameters includes the speed of the vehicle, a direction of the vehicle, an oil temperature, a battery charge amount, a fuel level, a road condition, an oil level, a fluids levels, and a tire pressure.

20. The system of claim 19 further comprising of ordering a fleet vehicle to report to a specific location to refuel by the server.

\* \* \* \* \*